(12) United States Patent
Sigatapu

(10) Patent No.: US 11,244,419 B2
(45) Date of Patent: Feb. 8, 2022

(54) METHOD AND APPARATUS FOR HARDWARE ACCELERATED GRAPHICS RENDERING IN BRIDGE APIS

(71) Applicant: 650 Industries, Inc., Palo Alto, CA (US)

(72) Inventor: Nikhilesh Sigatapu, San Francisco, CA (US)

(73) Assignee: 650 Industries, Inc., Palo Alto, CA (US)

( * ) Notice: Subject to any disclaimer, the term of this patent is extended or adjusted under 35 U.S.C. 154(b) by 0 days.

(21) Appl. No.: 16/614,766

(22) PCT Filed: May 24, 2018

(86) PCT No.: PCT/US2018/034297
§ 371 (c)(1),
(2) Date: Nov. 18, 2019

(87) PCT Pub. No.: WO2018/217970
PCT Pub. Date: Nov. 29, 2018

(65) Prior Publication Data
US 2020/0211149 A1 Jul. 2, 2020

Related U.S. Application Data

(60) Provisional application No. 62/510,525, filed on May 24, 2017.

(51) Int. Cl.
*G06T 1/00* (2006.01)
*G06T 1/20* (2006.01)
(Continued)

(52) U.S. Cl.
CPC ............ *G06T 1/20* (2013.01); *G06F 9/30036* (2013.01); *G06F 9/3867* (2013.01); *G06F 9/3877* (2013.01); *G06T 15/005* (2013.01)

(58) Field of Classification Search
CPC . G06T 15/005; G06T 1/00; G06F 8/30; G06F 8/34; G06F 9/3009; G06F 9/448; G06F 9/48; G06F 9/5038; G09G 5/363
See application file for complete search history.

(56) References Cited

U.S. PATENT DOCUMENTS

2006/0212456 A1  9/2006  Earhart
2011/0242119 A1  10/2011 Bolz et al.
(Continued)

FOREIGN PATENT DOCUMENTS

WO   WO 2012-082423 A1   6/2012

OTHER PUBLICATIONS

International Search Report for Application No. PCT/US2018/034297 dated Nov. 15, 2018.

*Primary Examiner* — Hau H Nguyen
(74) *Attorney, Agent, or Firm* — Moser Taboada

(57) ABSTRACT

Embodiments described herein disclose a method for rendering a frame using graphics accelerated hardware comprising determining whether a command invoked in a script is a graphics command or a non-graphics command, executing the non-graphics command in a first thread, adding the graphics command to a first batch of a backlog of batches in a graphics context to be executed in a second thread, locking, in the first thread, the backlog of batches not executed yet by the second thread and adding a second batch that is empty to the backlog and swapping, in the first thread, the second batch with the first batch.

13 Claims, 9 Drawing Sheets

(51) Int. Cl.
*G06F 9/30* (2018.01)
*G06F 9/38* (2018.01)
*G06T 15/00* (2011.01)

(56) References Cited

U.S. PATENT DOCUMENTS

| | | |
|---|---|---|
| 2013/0176323 A1 | 7/2013 | Son et al. |
| 2016/0358306 A1 | 12/2016 | Begeman et al. |
| 2016/0371082 A1* | 12/2016 | Yudanov .................. G06F 9/461 |
| 2017/0221173 A1* | 8/2017 | Acharya ............... G06F 9/4887 |
| 2018/0182154 A1* | 6/2018 | Potter ................... G06T 15/005 |

* cited by examiner

METHOD AND APPARATUS FOR HARDWARE ACCELERATED GRAPHICS RENDERING IN BRIDGE APIS

FIELD

Embodiments described herein generally relate to methods and apparatuses for hardware accelerated graphics rendering.

DESCRIPTION OF THE RELATED ART

Computers (both desktop and mobile) contain a Graphics Processing Unit (GPU) that is specialized for performing graphics related computations (such as matrix calculations). They also are directly connected to the display device (a monitor or the mobile device's screen) to drive it. This provides the hardware acceleration required for the complex user interface interactions of today's software.

Bridge APIs (such as React Native or the like) are often used in the developer community to quickly and efficiently develop rich user interface based applications that can be deployed cross-platform (e.g., on Windows, iOS, ANDROID, and the like) while maintaining the same bridge code in a well-known scripting languages such as JavaScript, or the like. However, out of the box, bridge APIs (e.g., React Native) lack a flexible hardware accelerated graphics API thus increasing difficulty for developers when developing intensive graphics applications. Given that React Native is a JavaScript API and that WebGL is a JavaScript specification for hardware accelerated graphics, an implementation of the WebGL specification for the JavaScript runtime in a bridge API such as React Native would enable flexible hardware accelerated graphics rendering for applications running the bridge API.

Therefore the inventors have described herein methods and apparatuses for flexible hardware accelerated graphics rendering.

SUMMARY

According to one embodiment, a method for rendering a frame using graphics accelerated hardware comprising determining whether a command invoked in a script is a graphics command or a non-graphics command, executing the non-graphics command in a first thread, adding the graphics command to a first batch of a backlog of batches in a graphics context to be executed in a second thread, locking, in the first thread, the backlog of batches not executed yet by the second thread and adding a second batch that is empty to the backlog, and swapping, in the first thread, the second batch with the first batch.

Other and further embodiments of the present disclosure are described below.

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope, for the embodiments may admit to other equally effective embodiments.

Figure 1:
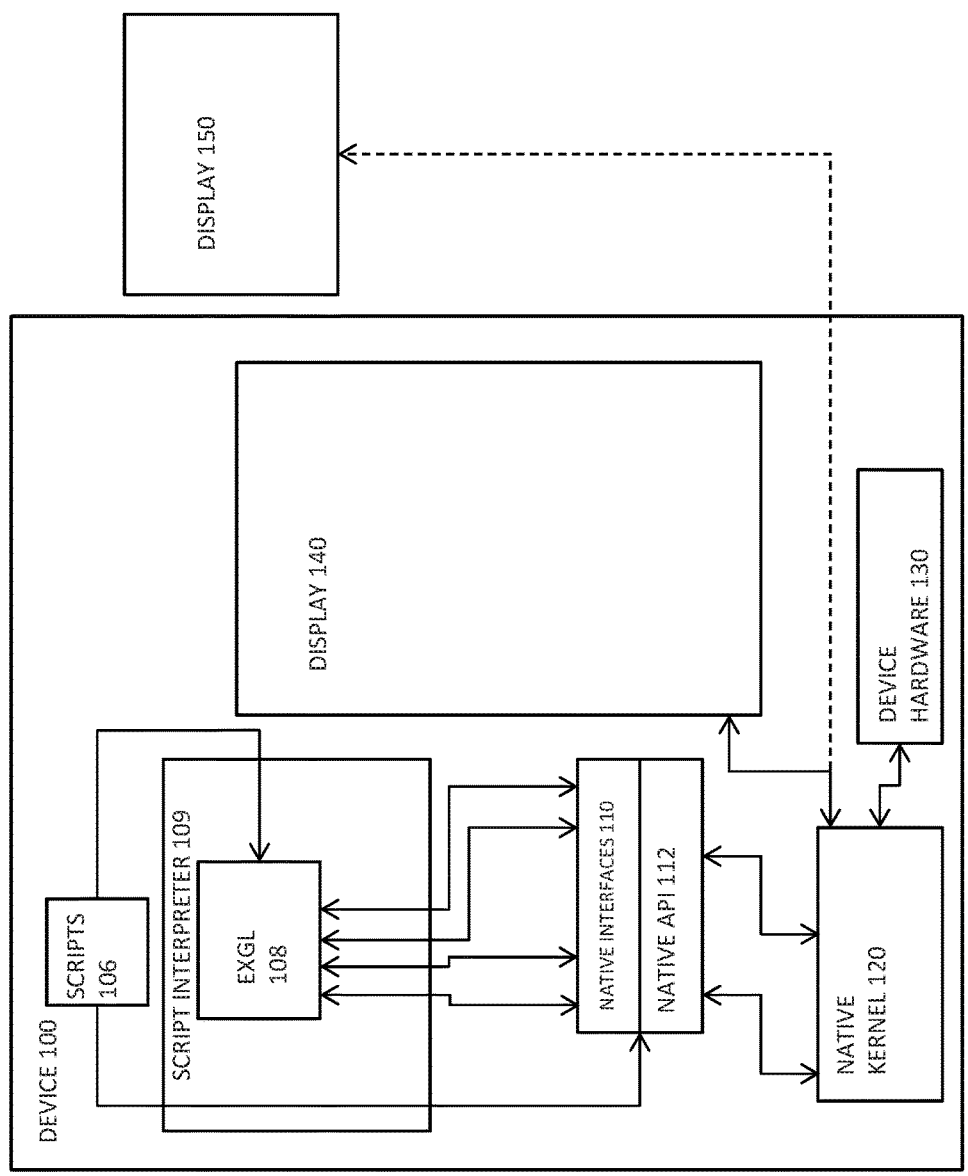
FIG. 1 is a block diagram of a device executing a script via an EXGL layer in accordance with exemplary embodiments described herein.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments described herein generally relate to methods and apparatuses for hardware accelerated graphics rendering. Bridge APIs may take the form of a JavaScript API such as React Native. WebGL is a JavaScript specification for hardware accelerated graphics. An implementation of the WebGL specification for the scripting runtime in a bridge API enables flexible hardware accelerated graphics rendering for bridge applications. The present disclosure describes some aspects of this implementation.

Generally an application written using the bridge API is executed on a device through several layers of bridge APIs, such as those described in FIG. 1. Bridge APIs generally use a multi-threaded model to provide a native end user experience while allowing application code (e.g., a scripting language such as JavaScript) to run in a scripted runtime (e.g., on the JavaScript Virtual Machine). Rich applications often contain animations, scrolling and other navigation tasks which occur at a high frame rate, generally 60 frames per second (fps). In the application, scrolling, navigation and the like are expected to respond to user input such as touch and drag with low latency.

If the latency is not reduced, user interface frame stutter is immediately noticeable and decreases the quality of the interaction considerably. Application level script (e.g., JavaScript code) involves pauses due to garbage collection and often is simply slower than equivalent native computation due to the virtual machine overhead of executing instructions. To keep the user's perceived performance of the user interface smooth, the bridge API runs the Scripting Virtual Machine on a thread referred to as Scripting Thread, separate from the thread on which user interface computation occurs, referred to as the main thread (or alternatively, the user interface thread).

With applications that contain graphics for rendering, EXGL, an implementation of the WebGL specification (a Web specification based on the OpenGL specification) is used. In iOS, OpenGL calls are performed on the main thread, while in the ANDROID operating system there is a specific GL thread. The application is written with a mixture of GL calls and non GL calls, thus the script interpreter passes the GL calls to the main/GL thread for processing while non GL calls are processed by the Scripting thread.

FIG. 1 is a block diagram of a device executing a script via an EXGL layer 108 in a device 100 in accordance with exemplary embodiments described herein.

The device 100 comprises one or more scripts 106 stored in device memory locally, or retrieved from a script browser such as described in co-pending PCT application No. US2017/019828. Each of the one or more scripts 106 is a collection of lines of code, each line representing one or more function calls, either to native functions of the device, scripting functions made available through a script layer, OpenGL calls, or native API calls. Each line of code is alternatively referred to as a "call", or "command", these terms being used interchangeably and generally understood to one of ordinary skill in the art to mean a line of code. While the lines of code are collectively referred to as scripts, one or more scripts form the source code of an application. According to some embodiments, the scripting language used in each script is JavaScript, while in other embodiments, different languages are used, such as Ruby, Python, PHP, Perl or the like. Those of ordinary skill in the art will recognize that the scripts 106 may also be written using languages not strictly referred to as scripting languages such as C++, C#, Java, Objective-C and the like.

The device 100 further comprises a script interpreter 109 which interprets each line of the one or more scripts 106 and performs calls to the native interfaces 110. The exposed native interface 110 comprises a set of functions that scripts 106 call in order to effectuate for example, a display change, inspect state of the hardware, or other calls dependent on native access to functionality of the device 100. These native interfaces 110 act as liaisons to the lower level native API 112. The native API 112 has direct access to the native kernel 120 of the operating system of device 100. The native kernel 120 can interact with the display 140, optional display 150, and/or device hardware 130. Calls to the exposed native interface 110 are pipelined through to the device hardware 130 via the native kernel 120.

In one embodiment the EXGL Layer 108 comprises a native class "EXGLContext" (in some embodiments a C++ class) that creates a GL "JavaScriptObject" and binds GL methods including, but not limited to, "gl.createShader( . . . )" and "gl.isEnabled( . . . )" into the JavaScriptObject to map to native function calls in the class EXGLContext. This binding is done using for example, JavaScriptCore, the API for the JavaScript virtual machine (VM) used in this embodiment. When the VM runs code, and performs a GL call, the method name is compared to the methods in the GL JavaScriptObject and finds that it's a native (e.g., C++) method binding. In turn, the native (C++) function is invoked, passing in GL as a parameter. The native function can return a value back to JavaScript. In this embodiment, the native function converts the arguments passed to the GL call and queues the actual OpenGL call onto the current batch.

The EXGL layer 108 singles out OpenGL calls and uses the GPU for hardware accelerated rendering. Some improvements introduces by the EXGL layer 108 include a threading model which does not block the user interface thread, minimizing the lag by having GL calls executed in another thread. The EXGL layer 108 also introduces a new memory model for sharing large data sets between threads as well as assigning "future" values to GL calls whose return value is used by other GL calls. FIGS. 2-6 and 8-10 detail these embodiments.

Those of ordinary skill in the art will recognize that the methods described herein may apply to different development platforms, including Android, iOS, Windows Mobile or the like. The script code and the native code may be Perl, PHP, Python, JavaScript, Java, C++, Objective C, C# or any other language generally used on the platforms. The embodiments do not limit the embodiments to the development languages, scripting frameworks or underlying operating systems described herein; the embodiments described herein are intended to apply to any system where a bridge API communicates with a native kernel to render hardware accelerated graphics via a graphics processing unit (GPU) of the device 100.

Figure 2:
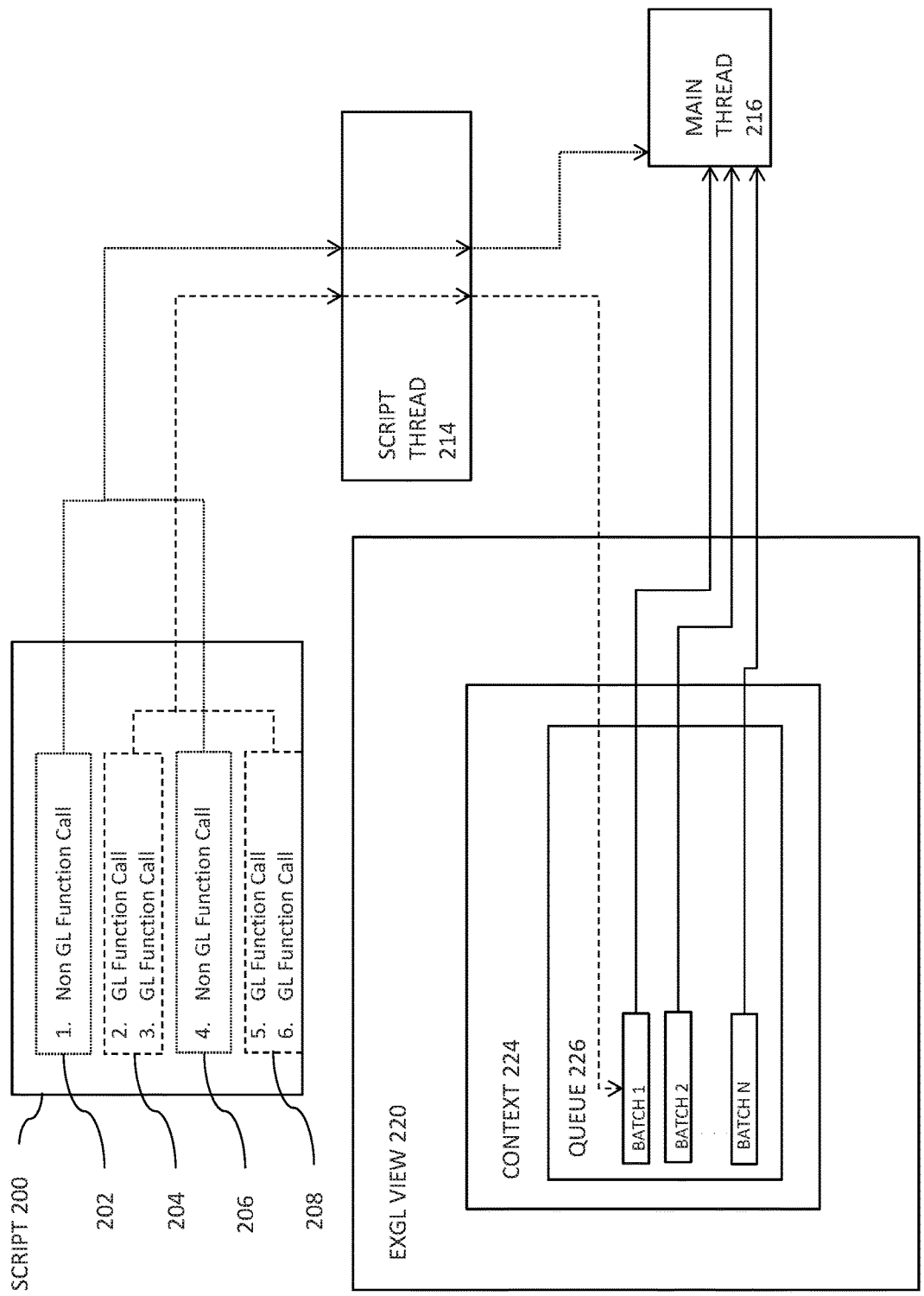
FIG. 2 is a block diagram of a multithreading model in accordance with exemplary embodiments described herein.

FIG. 2 is a block diagram of a multithreading model in accordance with exemplary embodiments described herein.

Script 200 is an example script that is interpreted by the script interpreter 109 and executed by the native kernel 120. The script contains one or more calls per line of the script. In FIG. 2, these calls have been grouped in first group 202, second group 204, third group 206 and fourth group 208. The first group 202 and the third group 206 comprise non GL function calls, or in other words, calls which do not invoke or use graphics rendering. For example, the first group 202 and the third group 206 may comprise calls to web services, arithmetic functions, authorization calls, or the like. The second group 204 and the fourth group 208 comprise GL Function calls such as "isEnabled . . . ", "glColor", "glTexImage2d" or the like. The fourth group 208 of function calls does not immediately occur after the second group 204; there are non-GL calls interspersed with GL calls in most scripts.

The script interpreter 109 interprets each line and if the line comprises a non-GL call, the calls are executed on the main thread 216. In contrast, if the lines comprise GL calls, the script thread 214 dispatches the calls to the EXGL View 220.

According to one embodiment, in iOS the EXGL view is implemented by instantiating an OS-level class for GUI views. In iOS, the "UIView" class is instantiated as a UIView object and graphics are drawn on that object with OpenGL using the OS-provided OpenGL API. The OS calls the "draw" function of the "UIView" object at a particular frame rate (for example 60 fps). In the "draw" function the buffer of the C++ EXGLContext backing the gl JavaScriptObject is flushed.

The EXGL View 220 comprises a context 224. The context 224 is a shared set of resources for GL calls. That is, the context 224 may be a graphics context which is the graphics object contains all the things needed to do drawing within a development platform. The context 224 contains a queue 226 which comprises multiple batches of GL calls: batch 1 to batch N. Each batch is a group of GL calls that are executed between a call to an end frame function (e.g., "gl.endFrameEXP( . . . )" in iOS) which marks a new batch. The batches are executed in the order created in time. So if batch 1 contains calls before the first call to the end frame function and batch 2 contains the calls between first call and the next (and so on), the batches are executed in the order 1, 2 ... to N.

Each GL call, for example in the second group 204 and the fourth group 208, are added to a batch as they occur sequentially in the script 200. So for instance, the second group (lines 2-3 of script 200) and the fourth group (lines 5-6 of script 200) is added to batch 1. Batch 1 to N are then executed by the main thread 216 at a later time independent of the script thread 214 (user interface thread) so as to avoid any latency in response to user input. However, from the perspective of a developer authoring script 200, the sequence of operations, threading, or the like are not considered because the EXGL layer 108 handles these tasks seamlessly without imposing on the developer.

Figure 3:
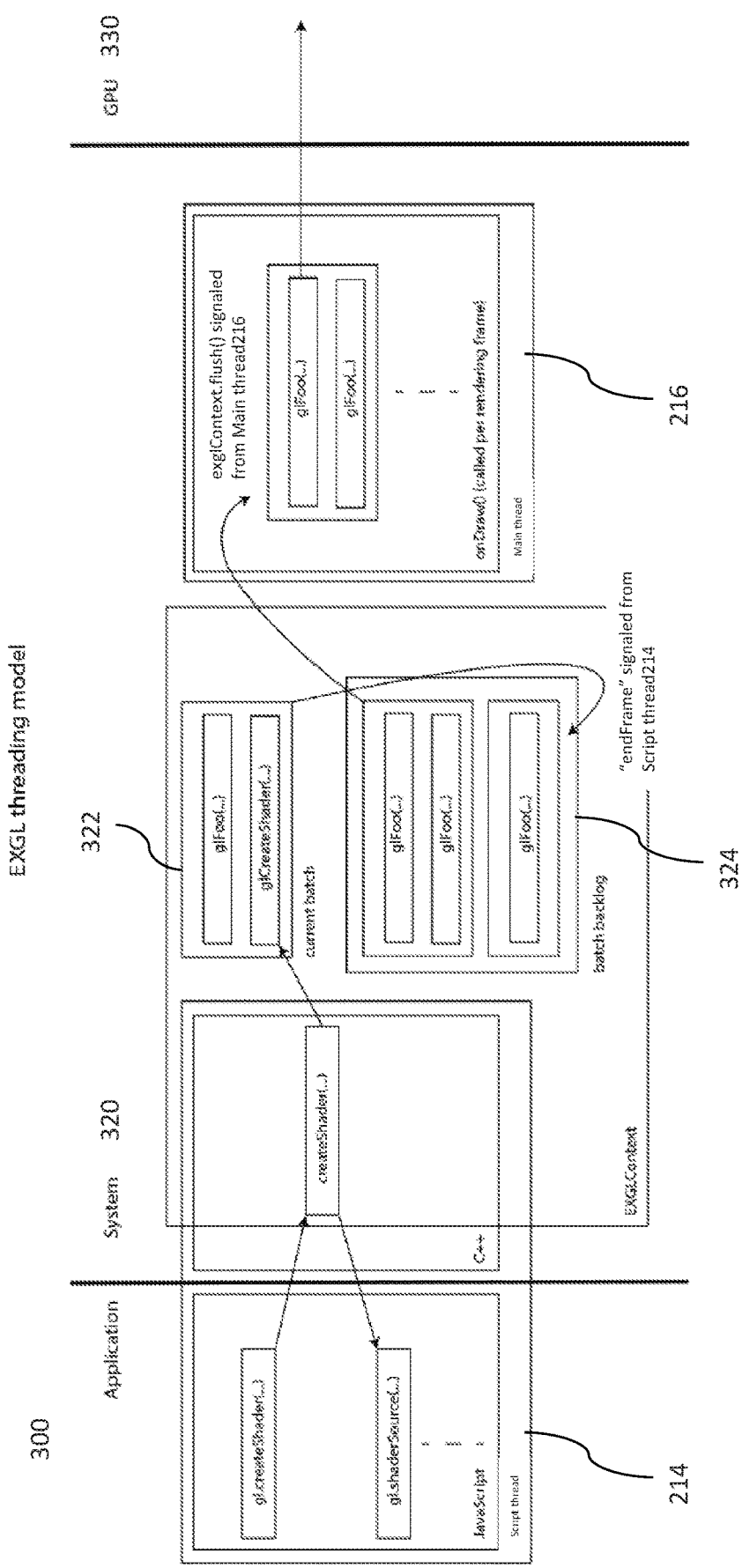
FIG. 3 is an example execution of the multithreading model in accordance with exemplary embodiments described herein.

FIG. 3 is an example execution of the multithreading model in accordance with exemplary embodiments described herein.

The application layer 300 (where the script sits for execution) is shown separate from the system layer 310 (where script calls are translated to native calls) and the GPU layer 320 (where the native calls are executed by the physical GPU).

At the application level 300, the script makes GL calls such as "gl.createShader( ... )". At the system level 320, the call gets translated by the script interpreter 109 into native code (e.g., C++ code) that creates the shader: "createShader( ... )" in the EXGL Context. In turn, the "createShader" is placed in a current batch 322 of GL calls. Concurrently, a batch backlog 324 which contains a backlog of GL calls is stored in the EXGLContext for execution in the main thread 326. The script thread 214 performs an "endFrame" call, which moves the GL calls contained in the current batch 322 to the batch backlog 324. Once the ExGL context is flushed in the main thread 216, the main thread 326 begins executing the GL calls contained in the batch backlog 324. These GL calls are then executed at the GPU level 330.

Figure 4:
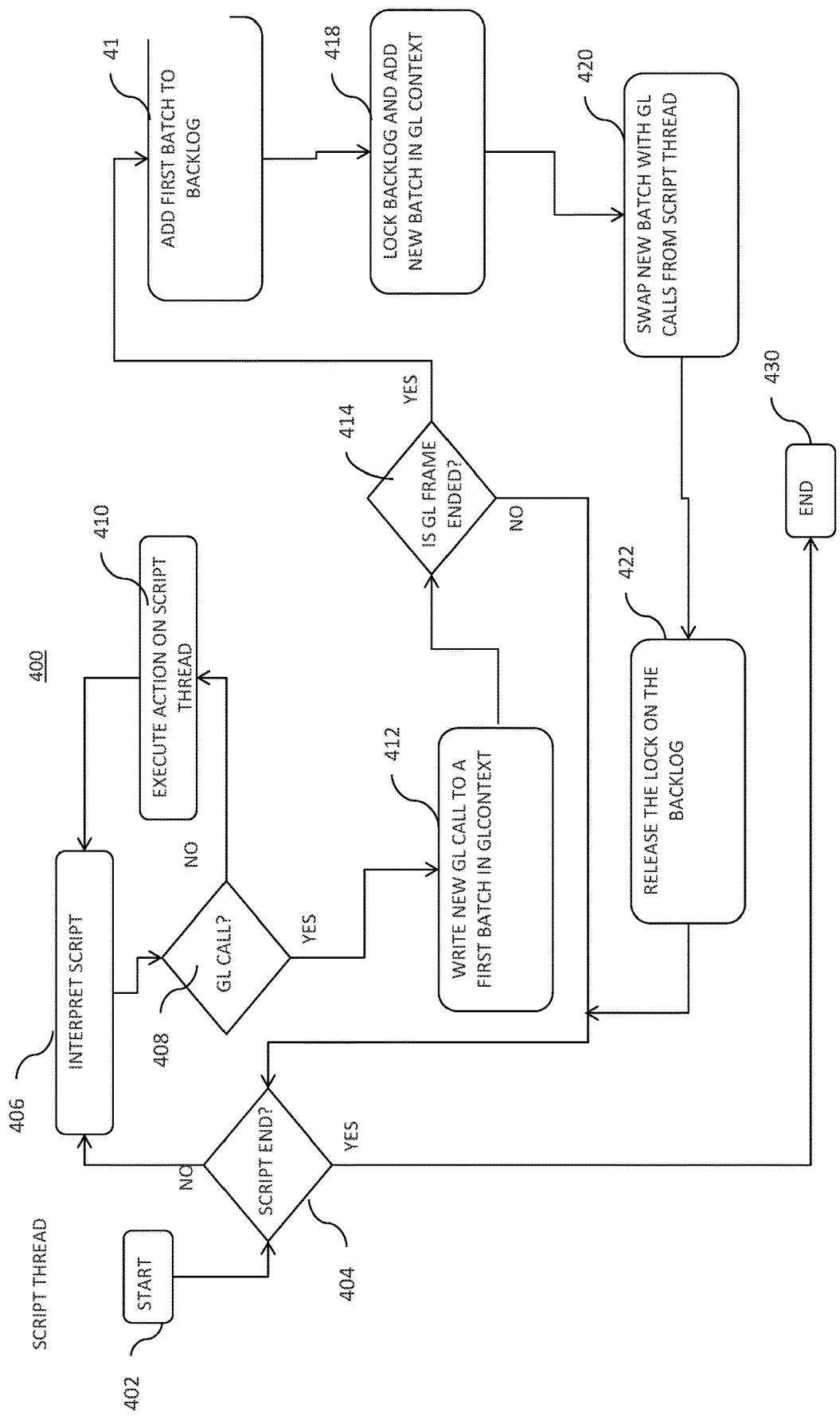
FIG. 4 is a flow diagram for a method for graphics rendering in accordance with exemplary embodiments described herein.

FIG. 4 is a flow diagram for a method 400 for graphics rendering in accordance with exemplary embodiments described herein. In exemplary embodiments, the script interpreter 109 is an implementation of the method 400, executed by the device hardware 130 which includes one or more processors, or the computer system 700 shown in FIG. 7. The method 400 represents the execution of the script thread 214 shown in FIGS. 2 and 3.

Method 400 begins at 402 and proceeds to 404 to determine whether the script interpreter 109 has processed all lines in the script. If so, the method 400 terminates at step 430. If the script interpreter 109 has not processed all lines in the script (e.g., script 200), the method proceeds to 406 where the line of the script is interpreted by the script interpreter 109. The steps shown in method 400 are executed on the script thread, for example, script thread 214.

At 408, the script interpreter 109 determines whether the current line of the script being interpreted contains a call to a GL function (e.g., a graphics rendering-related call). If the line does not contain a GL call, the method proceeds to 410 where the script line is interpreted to be executed as an action on the script thread (e.g., script thread 214). The method then returns to 404 to determine if there are any more lines of the script, and if so, to 406 to interpret the remaining lines in the script.

If the script interpreter 109 determines at 408 that the line of the script currently being inspected is a GL Call, method 400 proceeds to 412, where a new GL Call is written to a first batch in the EXGL Context as shown in FIGS. 2 and 3. If the script thread has not ended the GL Frame at 414, the method returns to 404.

If the GL Frame is ended by the script thread, for example via a "endFrameEXP( )" call, the method proceeds to 416 where the first batch is written to the backlog batch in the EXGL Context (e.g., batch backlog 324 in EXGL Context in FIG. 3). At 418, the script thread locks the backlog batch from being used by other threads, making it safe to modify by the script thread, and inserts a new batch in the backlog EXGL Context so that the new batch is in the same region of memory of device 100. This new batch is then swapped with the GL Calls that are waiting to be executed in the script thread. According to exemplary embodiments, the swap operation is performed using the C++ standard vector class, which runs in constant time to avoid linear time copying.

At 422, the lock on the backlog is released and the method proceeds to return to 404. This approach performs a swap operation and adds a new batch into the backlog as well as clears the backlog, while also maintaining the queue of batches contiguously in memory, reducing the time under lock and increases the cache efficiency of a computer system reading the operations (GL Calls) since they are in the same region of memory. Meanwhile, the main thread (GL thread) has not passed the GL operations onto the GPU, but the backlog batches are already freed up for use by the script thread. Thus, after the backlog is unlocked, the main thread can begin execution of the GL operations as the script thread simultaneously adds more GL operations to the current batch. Once the end frame function is called in the script, the current batched is swapped into the backlog.

Figure 5:
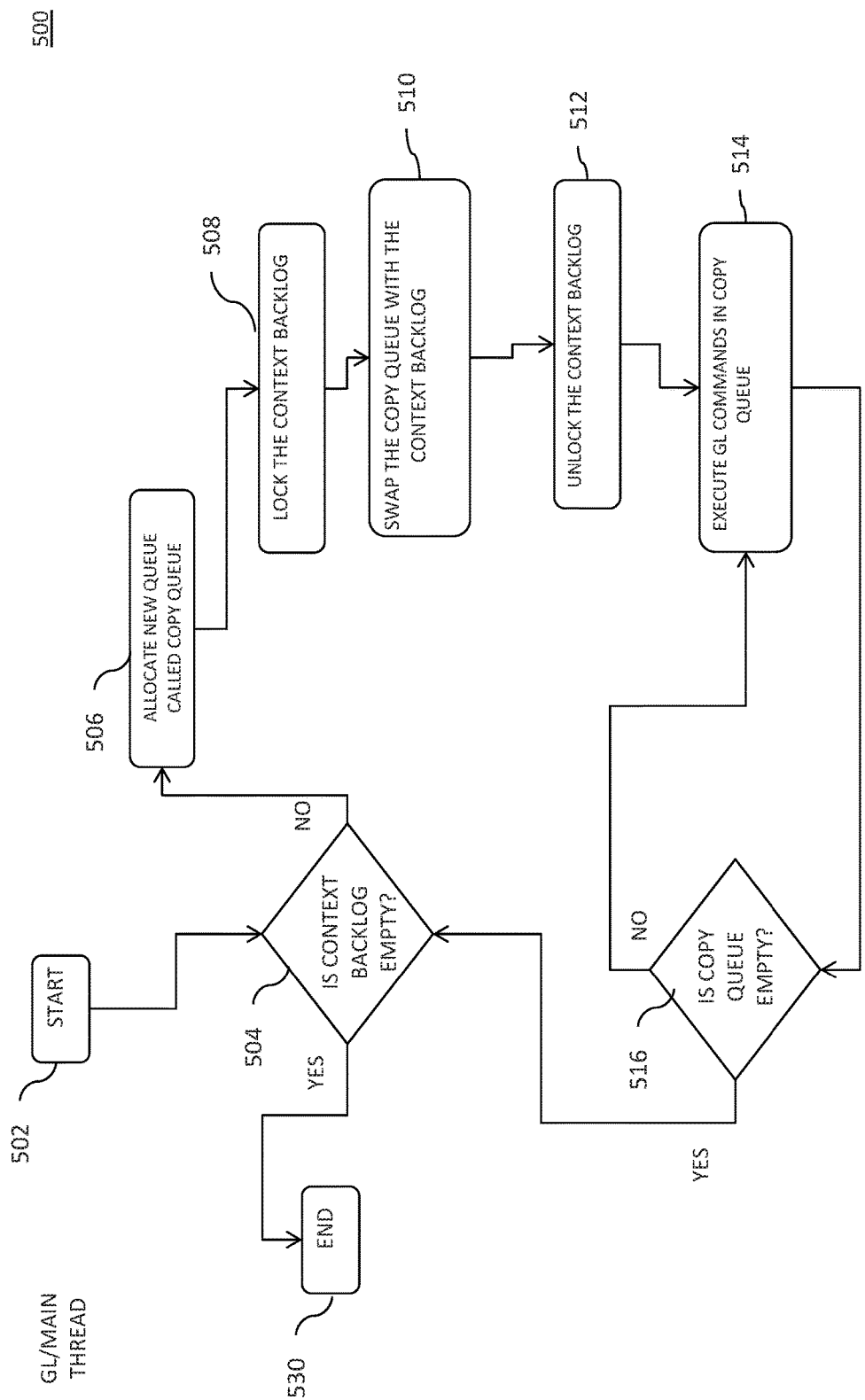
FIG. 5 is a flow diagram for another method for graphics rendering in accordance with exemplary embodiments described herein.

FIG. 5 is a flow diagram for another method 500 for graphics rendering in accordance with exemplary embodiments described herein. The script interpreter 109 is also an exemplary implementation of the method 500 as executed by the device hardware 130 in FIG. 1 or the computer system 700 shown in FIG. 7. Method 500 represents the flow of the main thread 216 as executed in the script interpreter 109, independent of but synchronously with the script thread 214.

Method 500 begins at 502 and proceeds to 504, where the script interpreter 504 determines in the main thread whether the EXGL Context backlog is empty. If the backlog is empty, the method terminates at 530. If the backlog contains GL instructions, the method proceeds to 506 where the script interpreter allocates a new queue (or batch) called the copy queue.

The context backlog is locked at 508 and the copy queue is swapped with the backlog at 510. At 512, the main thread unlocks the context backlog and executes the GL commands in the copy queue at 514.

If the copy queue still contains GL operations at 516, the method returns to 514, otherwise the method returns to 504 where the main thread determines whether context backlog is empty or not.

In practice method 400 and 500 allow software with hardware accelerated graphics to provide the responsiveness that a native library offers for its native interfaces, while allowing the Script application code to be written independently of such systems scheduling concerns.

Figure 6:
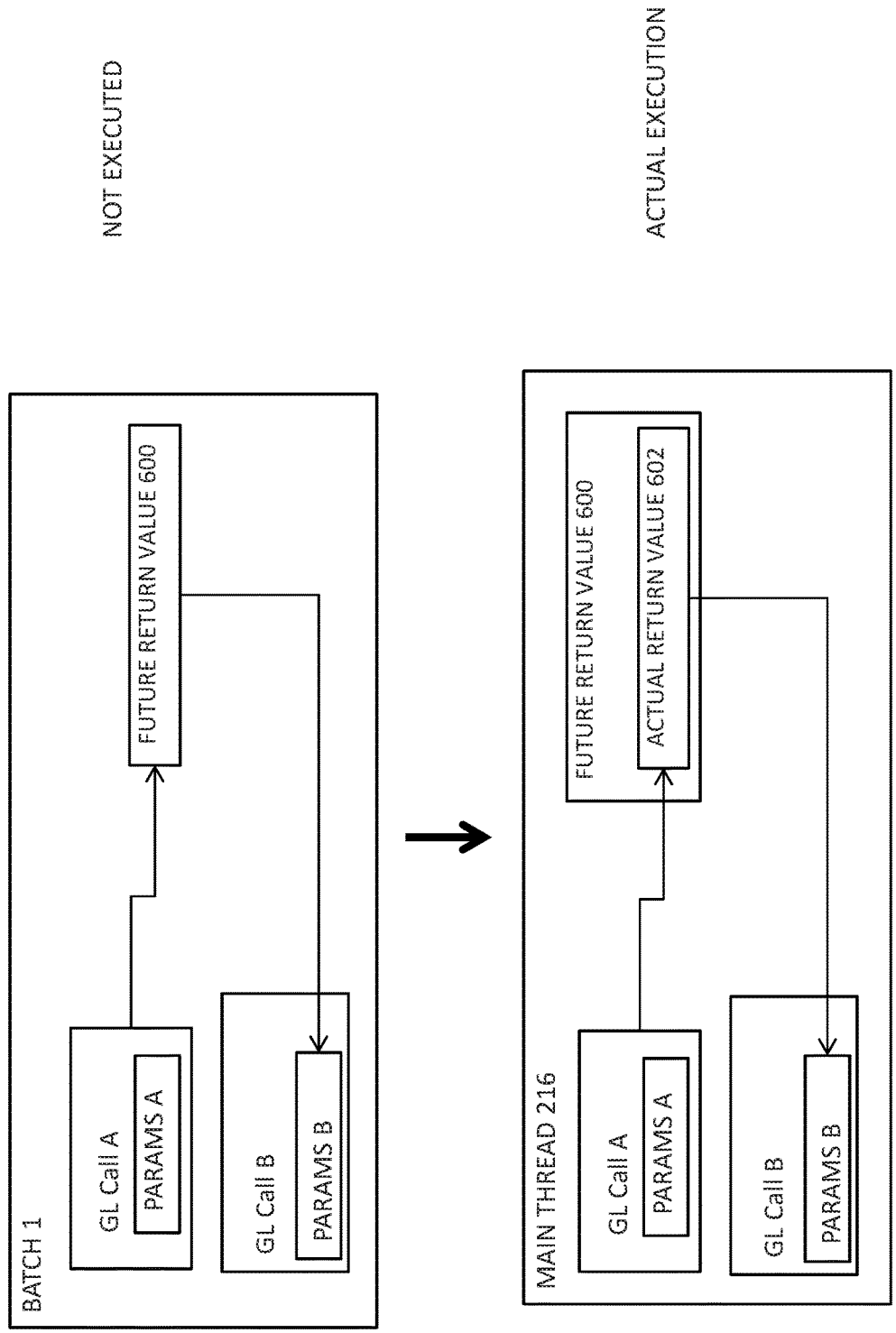
FIG. 6 is a block diagram illustrating future return values in accordance with exemplary embodiments described herein.

FIG. 6 is a block diagram illustrating future return values in accordance with exemplary embodiments described herein.

With the addition of multithreaded script execution to native OpenGL interface, some complications arise. Many OpenGL calls are meant to return a value that is used by a future GL call. For example "createShader( ... )" returns an identifier for a shader it creates. In another example, the GL Call "isEnabled( . . . )" returns a Boolean value indicating whether a certain parameter is enabled in the GL Context. If the return value is meant to be used immediately in script code statements following the call, the return value may not be available by the time the script code gets to that call because the underlying OpenGL operation has not been performed yet and is simply queued for the main thread for later as described in methods 400 and 500. EXGL handles this return value issues in two cases. The first case is "future" return values, and the second case is "blocking" return values, each described below.

Future Return Values

Some values such as the identifier returned in "createShader( . . . )" are opaque to the script code. The identifier is supplied as a parameter to subsequent GL calls and their value is not directly interpreted in the script code since they are simply opaque handles to native resources. As an example, suppose a GL call "A" returns a value "v" which is subsequently provided to a GL call "B". The call to "A" would be queued to occur before the call to B in Batch 1 where it is not executed yet, so even if the call to "B" is queued in Batch 1 before "A" is executed on the main thread (at which point the return value "v" is not available since "A" hasn't been called), the actual call to "B" on the main thread occurs after "A" is executed on the main thread.

After call "A" is executed, the actual return value 602 is available for use by call "B" because the main thread executes GL operations in the same order that they are queued into the batches by the script thread. In this embodiment, the function call that queues call "A" returns a future return value 600 that will contain the actual return value 602 once "A" is called, and the call passes this future return value 600 into the function call that queues call "B". When "B" is called on the main thread, the future return value 600 will contain the actual return value 602 because "A" has already been called.

The call to "B" on the main thread 216 can then use the actual return value 602 to perform the desired function during actual execution of the GL calls. Thus, embodiments described herein user futures to achieve seamless opaque return value behavior without having the call to "B" block the script thread until the call to "A" is completed and the actual return value 602 is returned. Additionally, the application programmer need not be concerned about when a GL call's return value will be available to use with the prescribed scheme.

Blocking Return Values

However, not all return values are opaque as described above and may be used in non-GL related script functions or constructs. For example, a call to "isEnabled( . . . )" returns a Boolean value that can be inspected in the script code for an "if . . . then" construct. The return value in this instance must be immediately available for use by the construct since it sequentially follows the GL call and uses the return value in evaluation of the construct. This embodiment addresses the need for return values to be immediately available/inspectable for some GL calls by forcing such calls (e.g., "isEnabled( . . . )") to block the script thread until the calls are executed and a return value is received.

Figure 7:
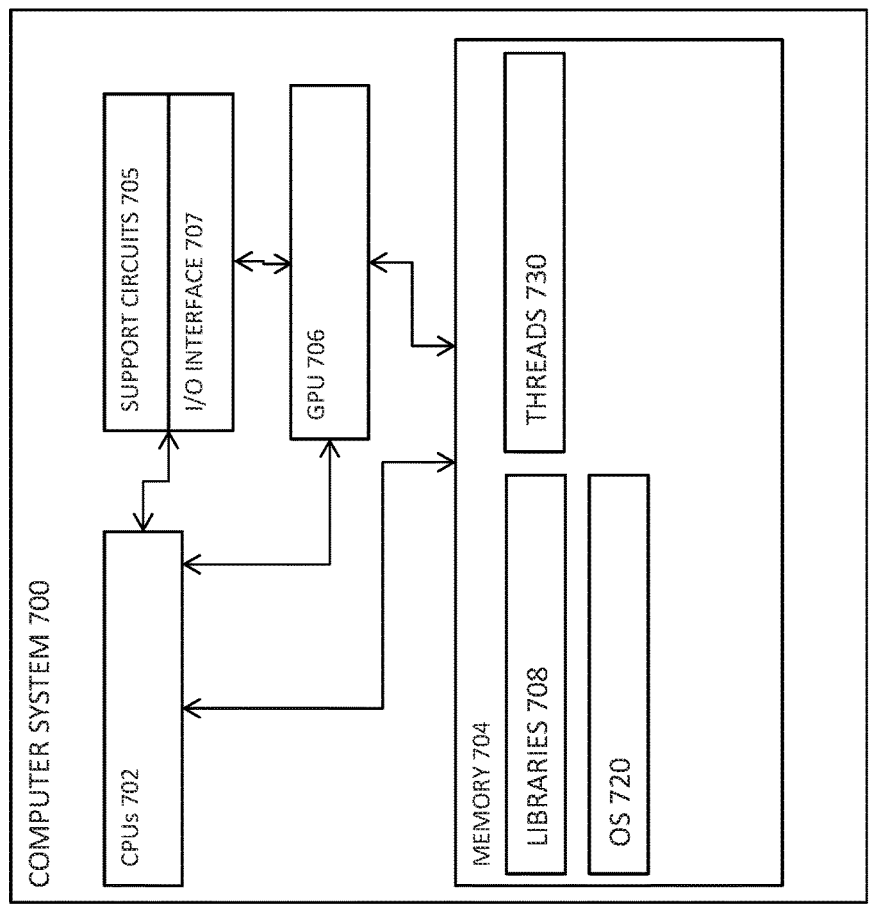
FIG. 7 is a block diagram of a computer system in accordance with exemplary embodiments described herein.

FIG. 7 is a block diagram of a computer system 700 in accordance with exemplary embodiments described herein.

The computer system 700 includes one or more CPUs 702, various support circuits 705, and memory 704. The CPUs 702 may include one or more microprocessors known in the art. The support circuits 705 include conventional cache, power supplies, clock circuits, data registers, I/O interface 707, and the like. The I/O interface 707 may be directly coupled to the memory 704 or coupled through the support circuits 705. The I/O interface 707 may also be configured for communication with input devices and/or output devices such as network devices, various storage devices, mouse, keyboard, display, video and audio sensors and the like.

The memory 704, or computer readable medium, stores non-transient processor-executable instructions and/or data that may be executed by and/or used by the CPUs 702. These processor-executable instructions may comprise firmware, software, and the like, or some combination thereof. Modules having processor-executable instructions that are stored in the memory 704 comprise various libraries 708, threads 730 and an operating system 720.

The computer system 700 may be programmed with one or more operating systems 720, which may include OS/2, Linux, SOLARIS, UNIX, HPUX, AIX, WINDOWS, IOS, and ANDROID among other known platforms. The memory 704 may include one or more of the following: random access memory, read only memory, magneto-resistive read/write memory, optical read/write memory, cache memory, magnetic read/write memory, and the like, as well as signal-bearing media as described below.

Those skilled in the art will appreciate that computer system 700 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 700 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

Figure 8:
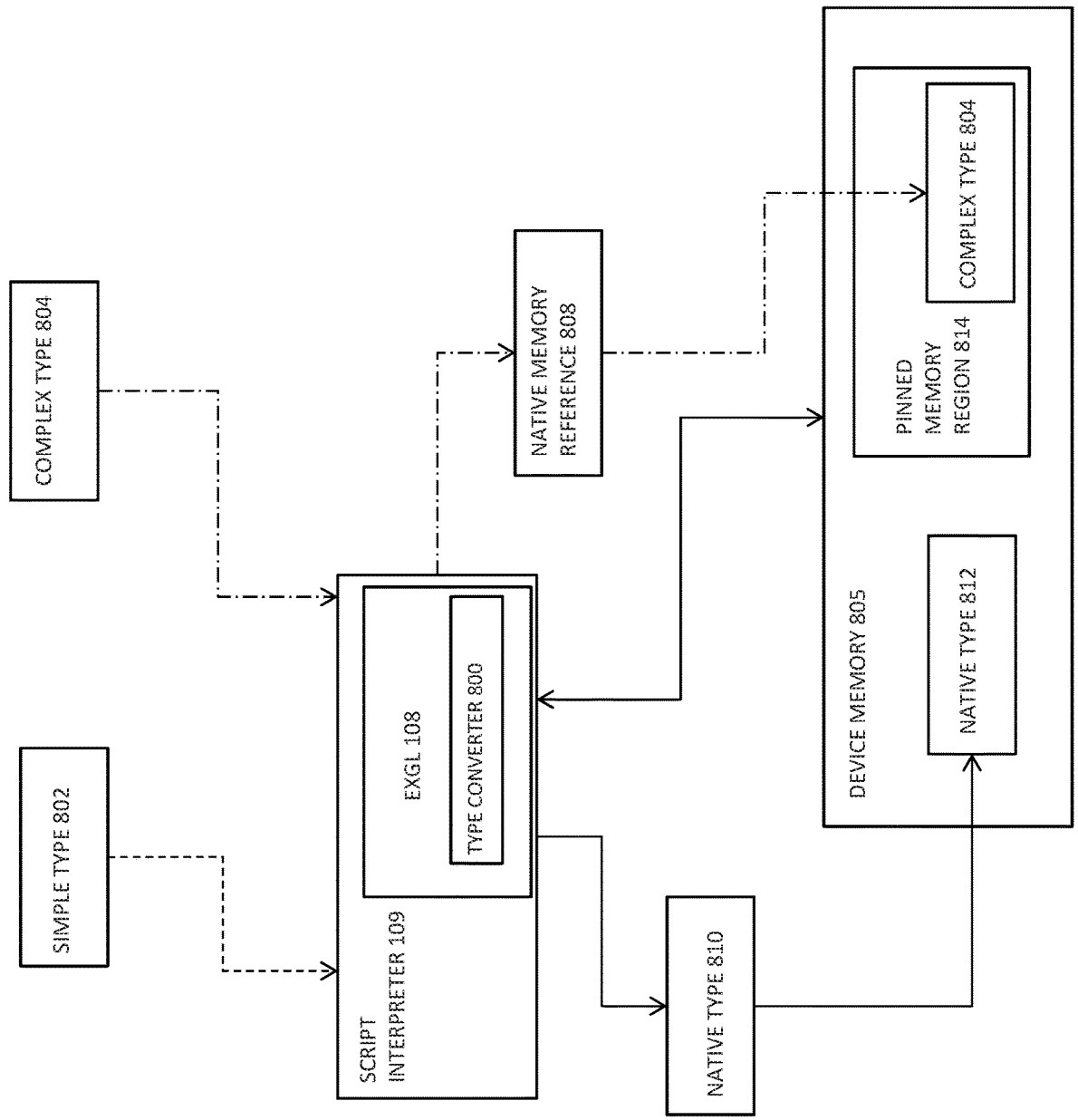
FIG. 8 is a block diagram of a type converter executed by the script interpreter in accordance with exemplary embodiments described herein.

FIG. 8 is a block diagram of a type converter 800 executed by the script interpreter 109 in accordance with exemplary embodiments described herein.

The script interpreter 109 also further comprises, in some embodiments, a type converter 800 which converts or translates simple or complex types into types operable by a device (e.g., device 100 or computer system 700) to store and access form the device memory 805.

The type converter 800 converts a simple type 802 into a native type 810. However a complex type 804 is handled differently by the script interpreter 109. EXGL 108 directly refers to the underlying memory of a complex type 804 (e.g., an array buffer) in its native form as native memory reference 808 without having to convert the complex type 804. The overhead remains constant for the conversion of such an array, rather than the linear amount of overhead that would be involved in the conversion of each element in the array from script form to native form. This greatly increases the efficiency of graphics rendering by allowing script-based application code (for example, JavaScript) to simply pass around handles to native memory that are used by the native OpenGL implementation underneath as the backing store for GPU data. Since these handles refer to an array buffer, the underlying values are still visible to and manipulable from the script and they don't serve only as opaque handles. This allows the script code to generate, for example, colored texture data based on user input or from a network request, then transfer that to the GPU with constant time overhead and have the texture then rest in the GPU for the rendering of future frames without any copying overhead.

One complication with the direct use of array buffer data by native OpenGL calls is that, due to the buffered nature of EXGL's rendering pipeline, an array buffer may be collected by the garbage collector before a buffered OpenGL call that refers to it as a parameter is actually executed on the GL thread. To handle this case, the memory corresponding to a complex type 804 (e.g., an array buffer) used as a parameter for a buffered OpenGL call is pinned in pinned memory region 814 of device 100 (or system 700) so that the array buffer is not collected by a garbage collector associated with the native libraries. The complex type 804 is then referred to only using a native memory reference 808 which directly points to the underlying memory, as opposed to copying the entire complex type 804. The array buffer is subsequently unpinned from memory once the array buffer is consumed on the main thread 216.

The pinning and unpinning from pinned memory region 814 remains a constant time operation in the native library. For the use of remote assets for texture data so that an application can download an image from the web and apply effects on it for rendering, the downloading is performed entirely on an OS native thread (e.g., a network thread) separate from the script thread 214 and the main thread 216 and the call to "texImage2D( . . . )" (the function in the WebGL spec that selects an array buffer as texture data) accepts a local file URI as the data parameter to use directly. The script only sends out an instruction to download a particular file and the file is referred to by name, but the actual bytes of the file are not passed through script calls. The FL texture also refers to the file by name while the GL native calls read the file directly. For example, if the texture is 1024 bytes in size, script does not iterate through each of the 1024 bytes, but instead only refers to the texture by its name, or handle. Remote texture data can be used for rendering with a constant time amount of processing in script code because the script code does not have to process each byte of texture data in the complex type 804. Instead, this embodiment allows the script code to simply use the native memory reference (handle) that refers to the complex type 804 in pinned memory region 814.

Figure 9:
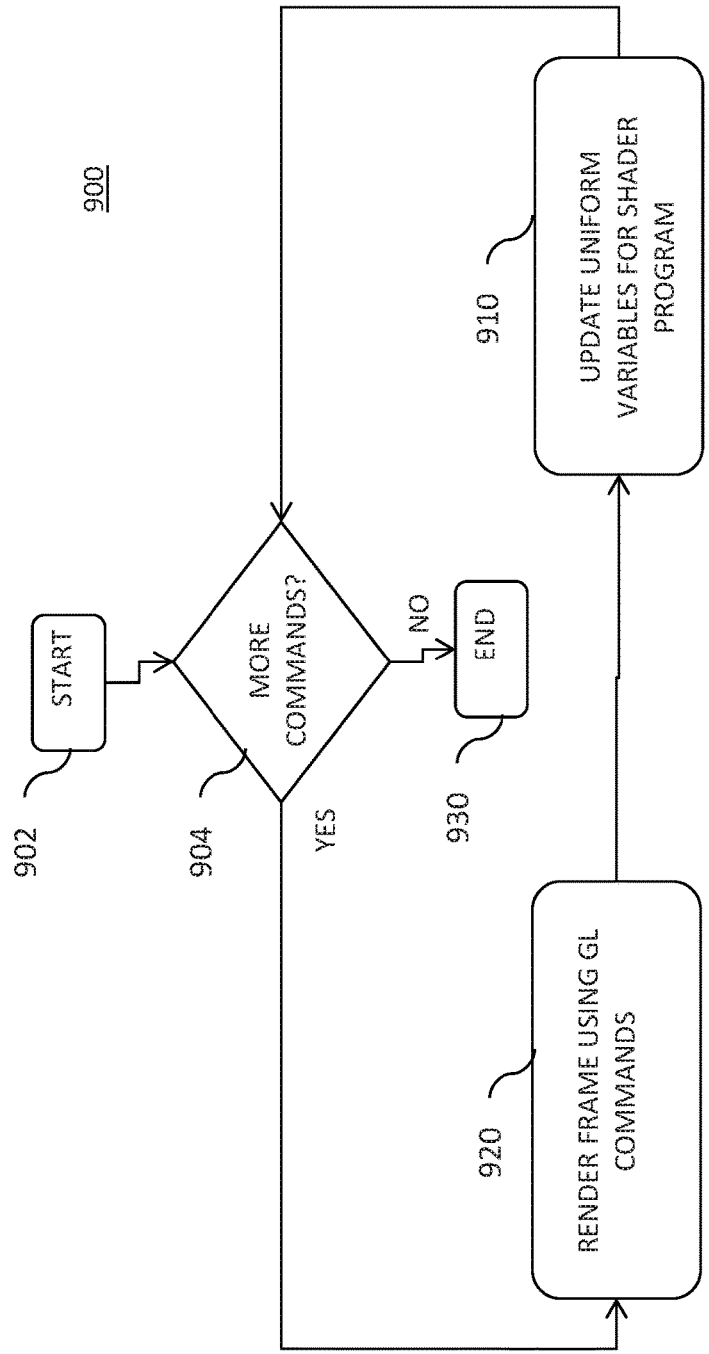
FIG. 9 is a flow diagram for a method for rendering graphics in the background in the GL thread in accordance with exemplary embodiments described herein.

FIG. 9 is a flow diagram for a method 900 for rendering graphics in the background in the main thread 216 in accordance with exemplary embodiments described herein. Method 900 illustrates the flow of the Main thread (e.g., GL thread) 216 for rendering objects using a shader while the script thread 214 executes simultaneously.

The main thread 216 begins at step 902 and proceeds to 904. At step 904, the main thread determines if there are more commands to be executed. If there are no more commands, the method ends at 930. Otherwise, the method proceeds to 920 where the frame is rendered using the GL commands passed to the main thread 216. At 910, the method updates the uniform variables that are parameters for the shader programs. The method returns to step 904 to determine if more commands are queued up in the main thread 216.

An example run of this method would proceed as follows. In GL Applications, developers can process geometry vertices and pixels via code referred to as a shader. The shader operates on each individual pixel or vertex and may transform it to suit the developers need. For example, a GLSL shader may renders a cube at an "x" coordinate given by the function "sin(t)" where "t" is a uniform variable set using the GL call "glUniform( . . . )".

According to this embodiment, the shader and the geometry are provided from the script once, at the beginning of the program and then rendered in the main thread (for example at 60 fps) via a call to the GL function "glDrawArrays( . . . )". Meanwhile, the time value "t" is updated with "glUniform( . . . )" while the script thread 214 may be slowly performing some other operation such as downloading and processing files over the network. Using method 900 and the previously described methods, EXGL can be used for highly smooth animations driven by the main thread 216 (running at high frame rates, for example 60 fps), that are still flexibly defined by the script thread 214 (since the shader and geometry is given from the script).

In some embodiments, the EXGL layer 108 treats certain GL statements as "prepared GL statements", where the when the script thread 214 queues, for example, the "glUniform( . . . )" and "glDrawArrays( . . . )" calls in a batch, but also informs the main thread 216 that this batch is meant to be performed repeatedly at a particular frame rate (e.g., 60 fps) on the main thread 216. In this embodiment, once the batch of calls with prepared GL statements are executed, they are not cleared from the batch and continue to exist in the batch backlog. Accordingly, EXGL 108 allows graphics rendered via GL to proceed smoothly at, for example, 60 fps, while other tasks occupy the script thread, all by reallocating device processing.

While the foregoing is directed to particular embodiments, other and further embodiments may be devised without departing from the basic scope thereof, and the scope thereof is determined by the claims that follow.

The invention claimed is:

1. A method for rendering a frame using graphics accelerated hardware, comprising:
   interpreting lines of a script for rendering a frame including graphics command and non-graphics commands;
   for each non-graphics command, executing the non-graphics command in a first thread;
   for each graphics command, adding the graphics command to a first batch of a backlog of batches in a graphics context to be executed in a second thread;

issuing, by the first thread, a command to end the frame; and in response to the command to end the frame:
- locking, by the first thread, the backlog of batches not executed yet by the second thread and adding a second batch to the backlog; and
- swapping, in the first thread, the second batch with the first batch.

2. The method of claim 1, further comprising:
- allocating, by the second thread operating, a first queue;
- locking, by the second thread, the backlog and swapping the first queue with the backlog;
- unlocking, by the second thread, the backlog; and
- executing, by the second thread, the graphics commands in the first queue.

3. The method of claim 2, wherein the second thread operates synchronously with the first thread.

4. The method of claim 1, wherein the swapping is performed using a standard vector class, which runs in constant time to avoid linear time copying.

5. The method of claim 1, wherein the second batch added to the backlog is empty.

6. The method of claim 1, wherein the second batch is stored in a same region of memory the first batch.

7. The method of claim 6, wherein time under lock is reduced and cache efficiency of a computer system reading the script is increased since the first batch and the second batch are in the same region of memory.

8. The method of claim 1, wherein the swapping clears the backlog, while also maintaining a queue of batches contiguously in memory.

9. A method for rendering a frame using graphics accelerated hardware, comprising:
- determining, in a first thread, that a first queue in a graphics context backlog contains graphics commands;
- allocating a second queue;
- issuing, by the first thread, a command to end a frame; and
- in response to the command to end the frame:
  - locking the graphics context backlog;
  - swapping the second queue with the graphics context backlog;
  - unlocking, by the first thread, the backlog; and
  - executing the graphics commands in the second queue.

10. The method of claim 9, wherein the swapping is performed using a standard vector class, which runs in constant time to avoid linear time copying.

11. The method of claim 9, wherein the second queue is stored in a same region of memory the first queue.

12. The method of claim 11, wherein the time under lock is reduced and cache efficiency of a computer system executing the commands is increased since the first queue and the second queue are in the same region of memory.

13. The method of claim 9, wherein the swapping clears the backlog, while also maintaining a queue of batches contiguously in memory.

* * * * *